Figure 1:
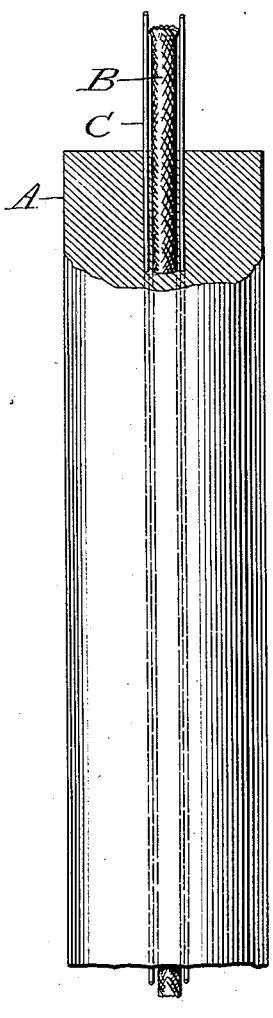

R. SCHEUBLE.
CANDLE EMITTING A COLORED LIGHT.
APPLICATION FILED MAR. 21, 1908.

984,029.

Patented Feb. 14, 1911.

Witnesses
B. G. Mattoon.
Ruth Stickman.

Inventor
Rudolf Scheuble,
by B. Singer,
Attorney

UNITED STATES PATENT OFFICE.

RUDOLF SCHEUBLE, OF ARNAU-ON-THE-ELBE, AUSTRIA-HUNGARY.

CANDLE EMITTING A COLORED LIGHT.

984,029.  Specification of Letters Patent.  Patented Feb. 14, 1911.

Application filed March 21, 1908. Serial No. 422,547.

*To all whom it may concern:*

Be it known that I, RUDOLF SCHEUBLE, chemist, a citizen of the Empire of Austria-Hungary, and resident of Arnau-on-the-Elbe, Bohemia, in the Empire of Austria-Hungary, have invented certain new and useful Improvements in Candles Emitting a Colored Light, of which the following is a specification.

This invention relates to the manufacture of candles which burn down gradually and evenly under the same conditions as ordinary candles, but differ from the latter however, in that they burn with a colored flame, the color being caused by a particular material or materials used in their manufacture. The ordinary candle material consisting of fats, paraffin, ceresin or the like, cannot be used for making these candles, as such materials produce a flame luminous in itself, the luminous effect being caused by the formation of small bright incandescent carbon particles in the flame. Any other coloring given the flame would be outshone by the brightness of these incandescent particles and would consequently have no effect. For this reason only nonluminous flames may have color imparted to them, such flames, for example, as are produced when burning certain chemical substances, such as hydrogen, carbon monoxid, or alcohol, or when burning other substances with excess of air, as in Bunsen burners. In the case of candles the latter method cannot be employed and materials for the candle body must be found which burn with a flame giving scarcely any light such as the flame of methylated spirit; but the substance chosen must be solid and stable, and suitable in other respects for candle material. In order to be suitable for forming the candle body, the melting point of the material must lie, say, between 50° C. and 130° C., while a boiling point or decomposition point at about 200°–300° C. is necessary. The possession of these two properties forms therefore an essential fundamental condition, as only the possession thereof insures a steady burning of the wick as in the case of ordinary candles. Furthermore, it is necessary that the material shall resist the influence of the air and shall possess a certain degree of solidity.

The materials heretofore used in the trade for the making of the candle body are not suitable for the purposes of my invention. I have found, however, that those aliphatic combinations which have a low molecular weight, and which are related to each other in their chemical constitution through the mutual possession of a carbonyl group and an amin group with or without a hydroxyl group, are suitable, and fulfil the specified requirements. Compounds so related include acid amids, esters of acids, especially polybasic acids, hydroxy acids and their esters, lactones and lactids, but the following are especially suitable for the purposes of my invention, viz., methyl oxalate, esters of oxamic acid, esters of carbamic acid, acetamid, anhydrid of lactic acid and lactid, lactamid, and succinimid. I may either employ one of the compounds mentioned, in the making of the candle body, or a mixture of two or more of them; good results may also be obtained by employing a mixture of substances of the above group with other substances hitherto used for making candles. These substances form, when the candle is burning, vapors or gases at the wick, which owing to the oxygen they contain, prevent the separation of free carbon in the flame. In order that the flame of the candle made of these materials may have the desired color imparted to it for the whole duration of the burning of the candle, only two methods have proved themselves practicable; mere impregnation of the wick with metallic salts for giving the desired color, or solutions of these salts incorporated in the candle body does not allow of attaining the end in view, for the reason that the color is only given if the free end of the wick happens to reach the exterior portion of the flame and the extent of the flame colored is comparatively small. The obviously simple method of adding volatile compounds to the candle material for coloring the flame has been found to be impracticable, because compounds producing certain colors by their combustion, for example boracic acid for green, and alkyl selenium compounds for blue colorations, have many disadvantages, for instance, most of them are liquids and are subject to decomposition, and many of them are poisonous or form poisonous products of combustion.

In the practice of my invention, I may proceed according to the following examples:—

A. The material to form the body of the candles is mixed with either nitrate of ammonium or nitrite of ammonium, or with a stable substance rich in oxygen and having like properties, which substance must be combustible without leaving any residue; for example, nitro-derivatives of organic compounds, organic nitrates and nitrites are highly suitable for fulfilling the required conditions. When the candle is lighted, the heat of the flame is sufficient to decompose these substances in the vicinity of the wick, and the oxygen gas or nitrogen gas which is a product of the decomposition, according to the nitrous substance used, has the effect of atomizing the metallic salts which are used for obtaining the coloration desired, such atomizing action projecting the fine particles of the metallic salts into the flame. The metallic salts are mixed in with the material of the candle body or are incorporated in the wick, or in both the wick and candle body. Very few of the above mentioned candle making materials are suitable for mixing with nitrate of ammonium so as to produce a mixture which burns steadily without the accompaniment of disturbing phenomena such as detonations. Esters of oxamic acid are suitable for the body of the candle. As an example 12 parts of ethyl oxamate, 5 parts of ethyl carbamate, and 3 parts of ammonium nitrate may be mixed and candles are cast, or made in any other suitable way from this mixture; when a red coloration of the candle flame is desired, the wicks are impregnated with either lithium, strontium or calcium salts, and with barium or thallium salts when green is desired.

B. In order to make candles according to the second practical method the candle is made from one of the above mentioned base materials.

In the accompanying drawings, I have illustrated embodiments of candles made according to this method, in which:—

Figure 2:
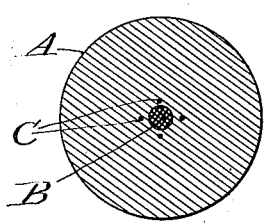
Figure 3:
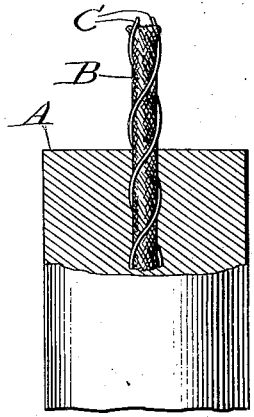
Figure 4:
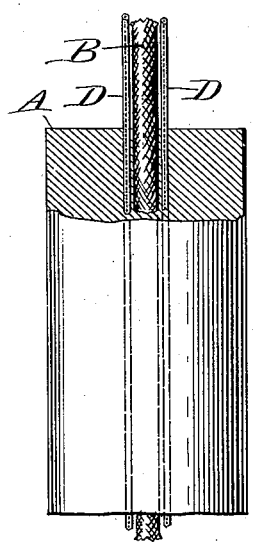
Figure 5:
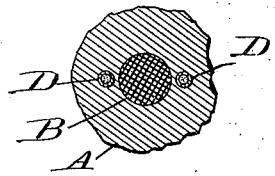

Figure 1 is a view, partly in elevation and partly in vertical section representing the wires, hereinafter referred to, embedded in the candle body; Fig. 2 is a horizontal section of the same; Fig. 3 is a view similar to Fig. 1 showing the wires twisted around the wick; Fig. 4 is a view similar to Fig. 1, showing the use of glass tubes containing the flame coloring materials; and Fig. 5 is a horizontal section of the candle shown in Fig. 4, showing the glass tubes relatively enlarged.

Referring particularly to Figs. 1 and 2, A represents the candle body, B the wick, and parallel with the wick and only a slight distance from it are placed one or more fine wires C, laminæ or the like consisting of a suitable mixture which will include the coloring material, such as an alloy of an easily fusible metal and the coloring material or if possible consisting wholly of the flame coloring material. As is shown in Fig. 3 the wires C may be twisted around the wick B. When such a candle is lighted the mixture protrudes from below into the flame and melts continuously according to the rate of the consumption of the candle. In this manner the color is imparted uniformly to the whole of the flame from the lowest point upward. An addition of chlorids to the material of the candle increases in many cases the brilliancy of the color. Instead of the wires very fine glass tubes may be used, which are filled in a heated condition with a molten mass of the metallic salt or salts to be used for coloring. Such a candle is shown in Figs. 4 and 5, in which A is the candle body, B the wick, and D are fine glass tubes, preferably capillary tubes, of glass, which are shown as placed parallel to the wick B. In Fig. 5 for purposes of illustration, I have represented the glass tubes which contain the flame coloring material as somewhat enlarged. Glass which contains sodium is not suitable for the glass tubes, except when yellow flames are desired. If chlorids are added to the mass, nitrogenous candle materials must not be used owing to the production and deposit of ammonium chlorid on the wick. An example of this second type of candle is one in which the candle body is made of ethyl carbamate, into which a small tube made of glass free from alkali and filled with chlorid of lithium is introduced parallel to the wick. The glass tube may be made either by drawing out a wider tube, so as to form a capillary tube, the wide tube being just filled with the molten coloring material; or chlorid of lithium may be drawn or pressed into the finished capillary tube which is subsequently heated to the melting point of lithium chlorid.

I claim:—

1. A candle for emitting a colored light, having its body composed of an organic substance of low molecular weight which contains a carbonyl group and an amin group, and flame coloring materials embodied in the said candle.

2. A candle for emitting a colored light, having its body composed of an organic substance of low molecular weight which contains a carbonyl group and an amin group, a compound containing oxygen and nitrogen which will yield one of its constituent gases on heating, mixed therewith, and flame coloring materials embodied in the said candle.

3. A candle for emitting a colored light, having its body composed of an organic substance of low molecular weight which contains a carbonyl group, an amin group, and an alkyl radical, a compound containing oxygen and nitrogen which will yield one of its constituent gases on heating mixed therewith, and flame coloring materials embodied in the said candle.

4. A candle for emitting a colored light, having its body composed of an ester of an organic acid of low molecular weight containing a carbonyl group and an amin group, a compound containing oxygen and nitrogen which will yield one of its constituent gases on heating mixed therewith, and flame coloring materials embodied in the said candle.

5. A candle for emitting a colored light, having its body composed of the ethylic ester of an organic acid of low molecular weight containing a carbonyl group and an amin group, a compound containing oxygen and nitrogen which will yield one of its constituent gases on heating mixed therewith, and flame coloring materials embodied in the said candle.

6. A candle for emitting a colored light, having its body composed of ethyl oxamate, a compound containing oxygen and nitrogen which will yield one of its constituent gases on heating mixed therewith, and flame coloring materials embodied in the said candle.

7. A candle for emitting a colored light, having its body composed of ethyl oxamate, ethyl carbamate, and a compound containing oxygen and nitrogen which will yield one of its constituent gases on heating, and flame coloring materials embodied in the said candle.

8. A candle for emitting a colored light, having its body composed of ethyl oxamate, ethyl carbamate, and an ammonium salt of a nitrogen-containing acid, and flame coloring materials embodied in the said candle.

9. A candle for emitting a colored light, having its body composed of ethyl oxamate, ethyl carbamate, and ammonium nitrate, and flame coloring materials embodied in the said candle.

10. A candle for emitting a colored light, having its body composed of ethyl oxamate, ethyl carbamate, and ammonium nitrate, and flame coloring materials embodied in the said candle in the vicinity of the wick.

11. A candle for emitting a colored light, having its body composed of ethyl oxamate, ethyl carbamate, and ammonium nitrate, and having its wick impregnated with a material for imparting to the flame the color desired.

12. A candle for emitting a colored light, having its body composed of ethyl oxamate, ethyl carbamate, and ammonium nitrate, and having its wick impregnated with a metallic salt for imparting to the flame the color desired.

13. A candle for emitting a colored light, having its body composed of ethyl oxamate, ethyl carbamate, and ammonium nitrate, and having its wick impregnated with a lithium salt.

In testimony whereof I affix my signature in presence of two witnesses.

RUDOLF SCHEUBLE.

Witnesses:
RUDOLF THEUMER,
RUD. ZIPSER.